US012776676B2

(12) United States Patent
Bauer et al.

(10) Patent No.: US 12,776,676 B2
(45) Date of Patent: Oct. 27, 2026

(54) ROTOR DEVICE OF AN ELECTRIC MACHINE, IN PARTICULAR FOR A TRACTION DRIVE OF A MOTOR VEHICLE

(71) Applicant: Dr. Ing. h.c. F. Porsche Aktiengesellschaft, Stuttgart (DE)

(72) Inventors: David Bauer, Asperg (DE); Christian Koenen, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 207 days.

(21) Appl. No.: 18/655,353

(22) Filed: May 6, 2024

(65) Prior Publication Data

US 2024/0380264 A1 Nov. 14, 2024

(30) Foreign Application Priority Data

May 10, 2023 (DE) ..................... 10 2023 112 301.7

(51) Int. Cl.
*H02K 1/28* (2006.01)
*H02K 1/276* (2022.01)

(52) U.S. Cl.
CPC ............... *H02K 1/28* (2013.01); *H02K 1/276* (2013.01)

(58) Field of Classification Search
CPC ........ H02K 1/2766; H02K 1/276; H02K 1/27; H02K 1/28; H02K 1/2706; H02K 1/272; H02K 1/24
USPC ............ 310/156.01, 156.31, 156.53, 156.56, 310/156.83
See application file for complete search history.

(56) References Cited

U.S. PATENT DOCUMENTS

| | | | | |
|---|---|---|---|---|
| 2015/0244244 | A1* | 8/2015 | Izumi | H02K 1/2766 29/598 |
| 2022/0294291 | A1 | 9/2022 | Kubota et al. | |
| 2023/0070394 | A1 | 3/2023 | Fatemi et al. | |
| 2023/0170746 | A1* | 6/2023 | Coppola | H02K 1/2766 |

FOREIGN PATENT DOCUMENTS

| | | | |
|---|---|---|---|
| DE | 102019117686 | A1 | 1/2021 |
| EP | 2306028 | A2 | 4/2011 |
| JP | 7080278 | B2 | 6/2022 |
| WO | WO 2018214917 | A1 | 11/2018 |
| WO | WO 2022096528 | A1 | 5/2022 |

* cited by examiner

*Primary Examiner* — Alexander A Singh
(74) *Attorney, Agent, or Firm* — LEYDIG, VOIT & MAYER, LTD.

(57) ABSTRACT

A rotor device, including a rotor having at least one rotor laminated core and drum radially enclosing the rotor. Magnetic units including inner and outer magnetic units are embedded in the rotor laminated core. The inner magnetic units are each arranged between at least one inner and intermediate sheet metal element. The outer magnetic units are each arranged between at least one intermediate and outer sheet metal element. Flux barriers extend along the magnetic units. At least one inner, intermediate, and outer sheet metal element are mechanically held together by the at least one drum. The at least one intermediate sheet metal element is fixed to the at least one inner sheet metal element by fixation bars in an area of the flux barriers. Each of the at least one outer sheet metal elements are fixed to the at least one intermediate sheet metal element by the fixation bars.

20 Claims, 2 Drawing Sheets

ROTOR DEVICE OF AN ELECTRIC MACHINE, IN PARTICULAR FOR A TRACTION DRIVE OF A MOTOR VEHICLE

CROSS REFERENCE TO RELATED APPLICATIONS

This application claims benefit to German Patent Application No. DE 10 2023 112 301.7, filed on May 10, 2023, which is hereby incorporated by reference herein.

FIELD

The invention relates to a rotor device of an electric machine, in particular for a traction drive of a motor vehicle.

BACKGROUND

In permanently energized synchronous machines (PSM), the generation of the magnetic field in the rotor is performed using a system consisting of one or more magnets. The magnetic flux of the rotor is usually constant. For high utilization of the reluctance torque, the magnets are usually buried in the rotor metal sheets in a V-shape or trough shape. One or more layers of such buried magnets can be implemented.

In order to keep the torque ripple of the machine as low as possible during operation, flux barriers are regularly used. For this purpose, the rotor laminated core is equipped with magnetically non-conductive or poorly conductive cavities, which extend along the buried magnets. In order to ensure the necessary mechanical strength of the rotor laminated core despite the flux barriers, the laminated core is reinforced around the cavities with bars, which keep the laminated core securely together even at high speeds. However, the bars again lead to increased scattering losses.

Sometimes rotors with buried magnets are also equipped with a drum. As a result, the bars of the laminated core in the area of the flux barriers can be omitted. By omitting the bars, the scattering losses are reduced so that efficiency and output increase. In order to keep the laminated core securely together even at high speeds (centrifugal force), such drums are usually made of metal or fiber-reinforced plastic.

Unlike PSM with buried magnets, machines with surface magnets also exist. They can generally provide a higher mechanical output with the same design space, the same magnetic mass and the same inverter. The disadvantages of this type of machine is typically its lower efficiency and poorer acoustic behavior in terms of torque ripple.

A PSM having a drum is known from DE 10 2019 117 686 A1, which also has surface magnets in addition to the buried magnets. The surface magnets are located between the laminated core and the drum and are secured by the drum. On the one hand, this utilizes the reluctance torque due to the buried magnets, on the other hand, a high flux density in the air gap is also created by the surface magnets.

However, the manufacture of such PSMs is sometimes very complex, as there are many tolerances due to the components. In addition, the rotor surface with its locally arranged surface magnets is not necessarily concentric.

SUMMARY

In an embodiment, the present disclosure provides a rotor device of an electric machine for a traction drive of a motor vehicle, comprising a rotor having at least one rotor laminated core and having at least one drum radially enclosing the rotor. Magnetic units comprising inner magnetic units and outer magnetic units are embedded in the rotor laminated core. The inner magnetic units are each arranged between at least one inner sheet metal element and at least one intermediate sheet metal element. The outer magnetic units are each arranged between the at least one intermediate sheet metal element and at least one outer sheet metal element. Flux barriers extend along the magnetic units. The at least one inner sheet metal element, the at least one intermediate sheet metal element, and the at least one outer sheet metal element are mechanically held together by the at least one drum. The at least one intermediate sheet metal element is fixed to the at least one inner sheet metal element by fixation bars in an area of the flux barriers. Each of the at least one outer sheet metal elements are fixed to the at least one intermediate sheet metal element by the fixation bars in the area of the flux barriers.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
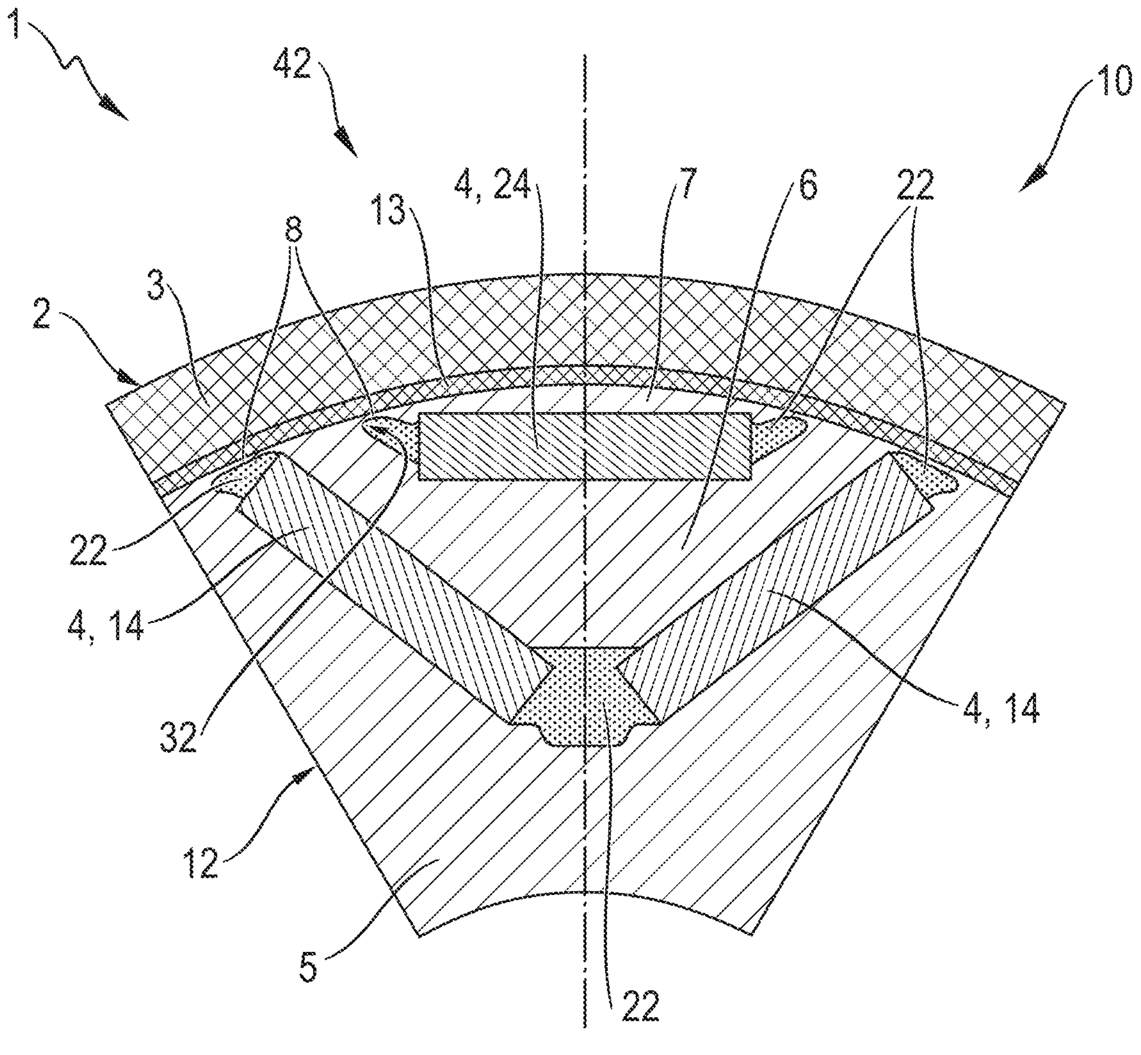
FIG. 1 is a schematic illustration of a rotor device according to an embodiment of the invention in a sectioned view.

In an embodiment, the present invention provides a rotor for a PSM which has as many of the previously discussed advantages as possible and at the same time can be manufactured as inexpensively and economically as possible.

The rotor device according to an embodiment of the invention is provided for an electric machine, and in particular for a PSM. The rotor device is provided for an electric traction drive of a motor vehicle, and preferably a passenger car. The rotor device comprises a rotor having at least one rotor laminated core and having at least one drum radially enclosing the rotor. Magnetic units are embedded or buried in the rotor laminated core. The magnetic units comprise internal magnetic units and external magnetic units. In particular, the rotor laminated core comprises at least one inner sheet metal element and intermediate sheet metal elements and outer sheet metal elements. The inner magnetic units are each arranged between at least one inner sheet metal element and at least one intermediate sheet metal element. The outer magnetic units are each arranged between the at least one intermediate sheet metal element and at least one outer sheet metal element. In particular, this results in a rotor having buried magnetic units. Flux barriers extend along the (inner and outer) magnetic units, which are in particular provided by local recesses in the rotor laminated core. The at least one inner sheet metal element and the intermediate sheet metal elements and the outer sheet metal elements (and in particular also the inner and outer magnetic units) are mechanically held together by the drum. The intermediate sheet metal elements are fixed to the at least one inner sheet metal element by means of fixation bars (which are very thin compared to conventional bars). The outer sheet metal elements are fixed to the intermediate sheet metal elements by means of fixation bars (which are very thin compared to conventional bars).

The rotor device according to an embodiment of the invention offers many advantages. A significant advantage is provided by the thin fixation bars in the area of the flux barriers in combination with the buried magnetic units and the drum. This makes use of the advantages of a PSM having buried magnets and drum, while significantly simplifying manufacturing. Despite the embedded magnets, the drum makes it possible to dispense with the inner bars or other bars usually provided, e.g., so that there are significantly less scattering losses. The fixation bars ensure that the numerous individual components can be easily handled before the drum is attached and at the same time are precisely aligned. Overall, the rotor device is therefore particularly well suited for serial production.

Preferably, the drum is suitable and designed to hold together the at least one inner sheet metal element and the intermediate sheet metal elements and the outer sheet metal elements alone (in particular without further technical means and in particular without the fixation bars and in particular without other bars) under the forces to be expected during the intended operation of the rotor device and to secure them against loosening and ejection (at the rotational speeds to be expected during operation).

In particular, the fixation bars are intentionally not suitable and designed to hold together at least one inner sheet metal element and the intermediate sheet metal elements and the outer sheet metal elements under the forces (and rotational speeds) to be expected during the intended operation of the rotor device. In particular, the rotor device comprises no bars (and no fastening structures in addition to the drum) that are suitable and designed to hold together the at least one inner sheet metal element and the intermediate sheet metal elements and the outer sheet metal elements under the forces expected during the intended operation of the rotor device.

It is advantageous and preferred that the fixation bars have a maximum thickness of 2 mm and preferably a maximum thickness of 1.5 mm, and particularly preferably a maximum thickness of 1 mm. Such particularly thin fixation bars offer particularly low scattering losses, and still enable sufficient fixation of the rotor sheet metal elements before and during assembly or manufacture of the drum.

In an embodiment, the fixation bars are integrally connected to the rotor laminated core. In particular, the fixation bars are each designed as at least one section and, in particular, the sheet metal section of the rotor laminated core. In particular, the fixation bars are designed to be integral with the rotor laminated core. In particular, the fixation bars and the at least one inner sheet metal element and the intermediate sheet metal elements and the outer sheet metal elements are integrally connected to each other. In particular, the fixation bars are manufactured by selectively removing material from the rotor laminated core, e.g. by punching. In particular, the fixation bars are manufactured as part of the manufacture of the recesses for the flux barriers.

It is also advantageous and preferable that the fixation bars close the flux barriers radially outwards. In particular, the fixation bars seal the rotor laminated core radially outwards. In particular, the fixation bars are arranged concentrically to the longitudinal axis of the rotor laminated core.

In an advantageous embodiment, it is provided that the fixation bars form a partial section of an outer side of the rotor laminated core extending in the circumferential direction. Preferably, the fixation bars are arranged flush with the outside of the rotor laminated core. In particular, the fixation bars and components of the rotor laminated core are arranged such that a cylindrical surface is created for the rotor laminated core. In particular, the fixation bars close the outside of the rotor laminated core at least in sections.

Preferably, the fixation bars are each curved. In particular, the fixation bars are curved so as to correspond to a curvature (running in the circumferential direction) of the rotor laminated core. In particular, the fixation bars are curved in the circumferential direction of the rotor laminated core. In particular, the radius of the curvature of the fixation bars and the radius of a curvature of the rotor laminated core are the same.

In an advantageous embodiment, at least partially rounded corners are designed at the transitions from the fixation bars to the rotor laminated core (in particular to the inner sheet metal element or intermediate sheet metal element or outer sheet metal element) on the side of the flux barrier (or the radial inside of the fixation bars). The rounded corners in particular have a defined radius so that stresses can be dissipated that occur due to the forces to be expected during the intended operation of the rotor device. As a result, the fixation bars, despite their thin structure (which is in itself not sufficient to mechanically fix the sheet metal component), can contribute to the stiffness of the rotor laminated core.

In particular, the radius preferably corresponds to at least one length of a single fixation bar in the circumferential direction. In particular, the radius is at least 5 mm, and preferably at least 7 mm, and particularly preferably at least 20 mm. Radii of at least 30 mm or at least 50 mm or more are also provided. In particular, the radius is also matched to the size of the rotor.

In an embodiment, at least one connecting layer made of at least one plastic material is arranged between the drum and the rotor laminated core. The connecting layer is in particular suitable and designed to absorb stresses that occur due to the forces to be expected during the intended operation of the rotor device. It is provided for the drum to be joined to the rotor laminated core by means of the connecting layer. For example, the connecting layer can serve to counteract undesirable movement of the drum relative to the rotor laminated core. In particular, the connecting layer has a smaller wall thickness than the wall thickness of the drum. In particular, the connecting layer is produced by a mold process. In particular, the connecting layer is a mold plastic. In particular, the drum is made of a plastic material, preferably by means of a molding process.

It is provided and advantageous that the flux barriers are at least partially filled with at least one plastic material. In particular, the plastic material is introduced into the flux barriers by means of a Mond process. It is provided that the plastic material for filling the flux barriers and the plastic material for the connecting layer are the same and/or manufactured using the same process (in particular a molding process).

The (outer and/or inner) magnetic units are in particular rod-shaped. Preferably, they are designed with a cuboid basic geometry. In particular, the magnetic units have a rectangular basic cross-section in the longitudinal direction and/or transverse to the longitudinal direction. This makes it particularly simple to manufacture the recesses for the flux barriers and to install the magnetic units. In particular, the magnetic units do not extend to the outside of the rotor. In particular, the magnetic units are separated from the outside of the rotor by the outer sheet metal element and/or the fixation bars.

It is provided and advantageous that the internal magnetic units of each rotor pole are arranged at least partially in a V-shape in relation to each other. In particular, the intermediate sheet metal elements and the outer magnetic units and the outer sheet metal elements of each rotor pole are arranged at least partially between the V-shaped inner magnetic units and/or the imaginary extension axes extending from them. In particular, the outer magnetic units (with their main plane) are arranged perpendicular to an imaginary radial axis that intersects an axis of rotation of the rotor. In particular, the inner magnetic units (with their main plane) are arranged at an angle or inclination to an imaginary radial axis, which intersects an axis of rotation of the rotor.

In an advantageous embodiment, the outer sheet metal elements are each fixed to (each) intermediate sheet metal element by at least two (only two) fixation bars. In particular, the intermediate sheet metal elements are each fixed to the at least one inner sheet metal element or to an inner sheet metal element with at least two (only two) fixation bars. In particular, the rotor poles are each equipped with such an arrangement.

In particular, all provided (inner and outer) magnetic units are arranged buried in the rotor laminated core. In particular, the rotor does not comprise any magnetic units that are not arranged under a portion of the rotor laminated core. In particular, the rotor does not comprise any surface magnetic units.

Use of the fixation bars of the rotor device for fixing the outer sheet metal elements to the intermediate sheet metal elements and for fixing the intermediate sheet metal elements to the at least one inner sheet metal element in the area of the flux barriers is also provided, whereby the fixation bars are intentionally not suitable and designed to hold together the at least one inner sheet metal element and the intermediate sheet metal elements and the outer sheet metal elements under the forces to be expected during the intended operation of the rotor device.

In particular, the rotor has a (maximum) diameter of between 85 mm to 200 mm in the finished assembly state, preferably between 95 mm to 185 mm, and particularly preferably between 100 mm to 170 mm. The features described in the context of embodiments of the present invention can be particularly advantageous for such a sized rotor. In particular, the electric machine is provided as a traction drive for an electric vehicle and/or a hybrid vehicle.

In particular, the at least one inner sheet metal element extends further radially outwards than the intermediate sheet metal elements and the outer sheet metal elements. In particular, the intermediate sheet metal elements extend further radially inwards than the outer sheet metal elements. In particular, the at least one inner sheet metal element and the intermediate sheet metal elements and the outer sheet metal elements each extend to the radially outside of the rotor laminated core. In particular, the at least one inner sheet metal element and the intermediate sheet metal elements and the outer sheet metal elements are arranged flush with one another on the radial outside. In the context of embodiments of the present invention, the rotor laminated core need not necessarily consist of packaged sheet metal. In particular, a rotor laminated core is also understood to mean a rotor body with another suitable structure.

In particular, the rotor comprises a plurality of rotor poles. In particular, a defined (cross-sectionally circular segment-like) section of the rotor core is associated with each rotor pole. In particular, the rotor poles are each assigned at least one inner sheet metal element and at least one intermediate sheet metal element and at least one outer sheet metal element. It is provided that the rotor poles can share a common inner sheet metal element. In particular, the inner magnetic units of each rotor pole are separated from each other by the flux barriers. The flux barrier is in particular used to inhibit the magnetic flux in the rotor laminated core.

In particular, the fixation bars are suitable and designed to connect the at least one inner sheet metal element and the intermediate sheet metal elements and the outer sheet metal elements to each other such that the at least one inner sheet metal element and the intermediate sheet metal elements and the outer sheet metal elements can be handled as a single unit even without the drum and, in particular, before the drum is attached (and preferably before the inner and outer magnetic units are inserted).

Further advantages and features of the present invention follow from the exemplary embodiments, which are described hereinafter with reference to the accompanying drawings.

FIG. 1 shows a rotor device 1 according to an embodiment of the invention, as can be used, e.g., in an electric machine 10 designed as a PSM. The rotor device 1 shown in this case can, e.g., be part of a vehicle drive or a traction motor of a battery-electric passenger car. The rotor 2 shown in this case has, e.g., a diameter of between 100 mm and 170 mm.

The rotor device 1 comprises a rotor 2 (in this case shown partially for better illustration). The rotor 2 is in this case shown in a sectional view looking in the direction of the operationally intended axis of rotation of the rotor device 1. The rotor 2 comprises, e.g., six or eight or ten or even more rotor poles 42, of which a single rotor pole 42 is shown in more detail in this case.

The rotor 2 comprises a rotor laminated core 12 and a drum 3 enclosing the rotor laminated core 12. The rotor sheet metal package 12 comprises an inner sheet metal element 5 and a plurality of intermediate sheet metal elements 6 as well as outer sheet metal elements 7. The rotor 2 is equipped with buried magnetic units 4, comprising inner magnetic units 14 and outer magnetic units 24. The magnetic units 4 are in this case rod-shaped and are designed to have a cuboid basic geometry.

In this case, the individual rotor poles 12 each comprise, e.g., three buried magnetic units 4, comprising two inner magnetic units 14 arranged in a V-shape and one outer magnetic unit 24. The individual rotor poles 12 are each associated with an outer sheet metal element 7 and an intermediate sheet metal element 6 as well as a common inner sheet metal element 5. The intermediate sheet metal elements 6 and the outer magnetic units 24 and the outer sheet metal elements 7 are arranged between the inner magnetic units 14, which are arranged in a V-shape.

The inner magnetic units 14 are each arranged between the inner sheet metal element 5 and the intermediate sheet metal element 6. The outer magnetic units 24 are each arranged between the intermediate sheet metal element and the outer sheet metal element 7. Flux barriers 22 extend along the magnetic units 4 to inhibit the magnetic flux. The flux barriers 22 are provided by recesses in the rotor laminated core 12. The recesses can also be referred to as intentional spacings between the sheet metal elements 5, 6, 7.

When using the drum 3, the rotor device 1 shown in this case does not require bars or comparable structures. Scattering losses are reduced as a result. The drum 3 is designed such that, alone and without further technical means, it is able to hold together the sheet metal elements 5, 6, 7 of the rotor laminated core 12 and secure them against loosening and ejection, even at high speeds.

The fixation bars 8 are provided to fix the intermediate sheet metal elements 6 and the outer sheet metal elements 7 as well as the magnetic units 4 to the inner sheet metal element 5 during assembly and before arranging or manufacturing the drum 3. For example, the fixation bars 8 in this case have a maximum thickness of 1 mm. Due to their minimal strength, there is only a very small disadvantage with regard to the scattering losses. The fixation bars 8 offer a significant improvement in concentricity and simplify the tolerance position of the sheet metal elements 5, 6, 7 in relation to each other. This offers considerable advantages, especially in series production.

In order to enable simple manufacture of the fixation bars 8 and at the same time to ensure a particularly reliable tolerance position, the fixation bars 8 are integrally connected to the rotor laminated core 12. In addition, the fixation bars 8 close the flux barriers 22 radially outwards and are arranged flush with the outside of the rotor laminated core 12. The fixation bars 8 are each curved such that they correspond to the curvature of the rotor laminated core 12.

Rounded corners 32 are in this case provided at the transitions from the fixation bars 8 to the rotor laminated core 12 on the side of the flux barrier 22. The largest possible radius is selected so that any stresses that occur can be easily dissipated. The flux barriers 22 are in this case filled with a plastic material and, e.g., a mold material that absorbs stresses.

A connecting layer 13 is in this case arranged between the drum 3 and the outside of the rotor laminated core 12. The connecting layer 13 is, e.g., a correspondingly thin mold layer, which has been applied to the outside of the rotor laminated core 12 and the fixation bars 8. The connecting layer 13 is, e.g., made of a plastic material or mold material which can absorb stresses.

Figure 2:
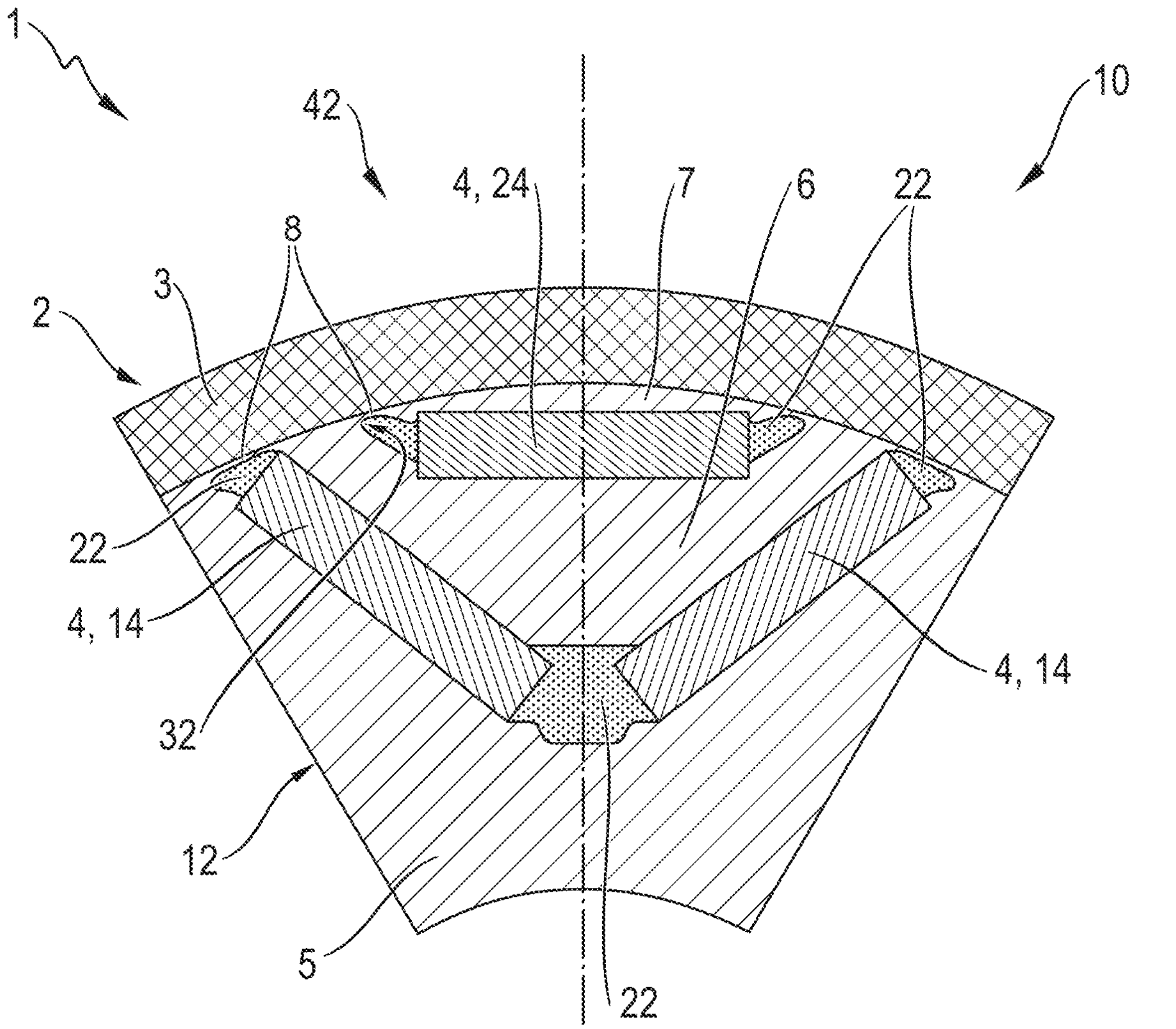
FIG. 2 is a further schematic illustration of a rotor device according to an embodiment of the invention in a sectioned view.

FIG. 2 shows an embodiment of the rotor device 1 described hereinabove. The connecting layer 13 was omitted in this case. The drum 3 is in this case located directly on the outside of the rotor laminated core 12 or on the fixation bars 8.

Embodiments of the invention presented herein provide a rotor device 1 for a PSM in which there are no tolerance chains regarding the outer diameter because is no stacking of loose sheet metal 5, 6, 7 and loose magnets 4 radially on top of each other. As a result, it is much easier to ensure the shape and position tolerances of the contact surface of the drum 3 and the rotor laminated core 12 on the outer rotor diameter. Rotor assembly is simplified as a result because only one rotor laminated core 12 need be handled for each rotor 2. In addition, the use of rectangular magnets results in reduced costs (less waste during manufacture). In addition, embodiments of the invention enable increased suitability for serial production compared to concepts without bars and with surface magnets or non-rectangular magnets. At the same time, the utilization of the magnetic material (power per kilogram of magnet) is increased. Embodiments of the invention further enable an increase in power density (power per weight) and an increase in speed (e.g., 10%), and thus a possible increase in the maximum speed of the vehicle.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "of" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE CHARACTERS

1 Rotor device
2 Rotor
3 Drum
4 Magnetic unit
5 Inner sheet metal element
6 Intermediate sheet metal element
7 Outer sheet metal element
8 Fixation bar
10 Machine
12 Rotor laminated core
13 Connecting layer
14 Magnetic unit
22 Flux barrier
24 Magnetic unit
32 Corner
42 Rotor pole

The invention claimed is:

1. A rotor device of an electric machine for a traction drive of a motor vehicle, the rotor device comprising:

a rotor comprising at least one rotor laminated core and comprising at least one drum radially enclosing the rotor, wherein magnetic units comprising inner magnetic units and outer magnetic units are embedded in the rotor laminated core, wherein the inner magnetic units are each arranged between at least one inner sheet metal element and at least one intermediate sheet metal element, wherein the outer magnetic units are each arranged between the at least one intermediate sheet metal element and at least one outer sheet metal element, wherein flux barriers extend along the magnetic units, wherein the at least one inner sheet metal element, the at least one intermediate sheet metal element, and the at least one outer sheet metal element are mechanically held together by the at least one drum, wherein the at least one intermediate sheet metal element is fixed to the at least one inner sheet metal element by fixation bars in an area of the flux barriers, wherein each of the at least one outer sheet metal elements are fixed to the at least one intermediate sheet metal element by the fixation bars in the area of the flux barriers, wherein the at least one drum is configured to hold together the at least one inner sheet metal element, the at least one intermediate sheet metal element, and the at least one outer sheet metal element alone under forces to be expected during operation of the rotor device and to secure the at least one inner sheet metal element, the at least one intermediate sheet metal element, and the at least one outer sheet metal element against loosening and ejection, and wherein the fixation bars are not configured to hold together the at least one inner sheet metal element, the at least one intermediate sheet metal element, and the at least one outer sheet metal element under forces to be expected during operation of the rotor device.

2. The rotor device according to claim 1, wherein the fixation bars have a maximum thickness of 2 mm.

3. The rotor device according to claim 2, wherein the maximum thickness of the fixation bars is 1.5 mm.

4. The rotor device according to claim 3, wherein the maximum thickness of the fixation bars is 1 mm.

5. The rotor device according to claim 1, wherein the fixation bars are integrally connected to the at least one rotor laminated core.

6. The rotor device according to claim 1, wherein the fixation bars close the flux barriers radially outwards.

7. The rotor device according to claim 1, wherein the fixation bars form a partial section of an outer side of the at least one rotor laminated core extending in a circumferential direction and are arranged flush with an outside of the at least one rotor laminated core.

8. The rotor device according to claim 1, wherein the fixation bars are each curved so as to correspond to a curvature of the at least one rotor laminated core.

9. The rotor device according to claim 1, wherein at least partially rounded corners with a defined radius are formed at transitions from the fixation bars to the at least one rotor laminated core on a side of the flux barriers such that stresses are configured to be dissipated that occur due to forces to be expected during operation of the rotor device.

10. The rotor device according to claim 1, wherein a connecting layer made of a plastic material is arranged between the at least one drum and the at least one rotor laminated core.

11. The rotor device according to claim 1, wherein the flux barriers are at least partially filled with a plastic material.

12. The rotor device according to claim 1, wherein the magnetic units are rod-shaped.

13. The rotor device according to claim 12, wherein the magnetic units have a cuboid basic geometry.

14. The rotor device according to claim 1, wherein the inner magnetic units of each rotor pole are arranged at least partially in a V-shape in relation to each other, and wherein the at least one intermediate sheet metal element and the outer magnetic units and the at least one outer sheet metal element of each rotor pole are arranged at least partially between the V-shaped inner magnetic units and/or imaginary extension axes extending therefrom.

15. The rotor device according to claim 1, wherein the at least one outer sheet metal elements are each fixed to an intermediate sheet metal element of the at least one intermediate sheet metal elements by at least two of the fixation bars, and wherein the at least one intermediate sheet metal elements are each fixed to an inner sheet metal element of the at least one inner sheet metal elements with at least two of the fixation bars.

16. The rotor device according to claim 1, wherein the outer magnetic units are each arranged perpendicular to a radial direction of the rotor.

17. The rotor device according to claim 1, wherein the inner magnetic units are oriented at different angles relative to the radial direction than the inner magnetic units.

18. The rotor device according to claim 1, wherein an innermost flux barrier of the flux barriers extends between to inner magnetic units that are arranged in a V-shape, the innermost flux barrier being arranged at a vertex of the V-shape, and wherein the inner magnetic units arranged in the V-shape have corners protruding into the innermost flux barrier such that the innermost flux barrier has an hourglass shape.

19. A rotor device of an electric machine for a traction drive of a motor vehicle, the rotor device comprising:

a rotor comprising at least one rotor laminated core and comprising at least one drum radially enclosing the rotor, wherein magnetic units comprising inner magnetic units and outer magnetic units are embedded in the rotor laminated core, wherein the inner magnetic units are each arranged between at least one inner sheet metal element and at least one intermediate sheet metal element, wherein the outer magnetic units are each arranged between the at least one intermediate sheet metal element and at least one outer sheet metal element, wherein flux barriers extend along the magnetic units, wherein the at least one inner sheet metal element, the at least one intermediate sheet metal element, and the at least one outer sheet metal element are mechanically held together by the at least one drum, wherein the at least one intermediate sheet metal element is fixed to the at least one inner sheet metal element by fixation bars in an area of the flux barriers, wherein each of the at least one outer sheet metal elements are fixed to the at least one intermediate sheet metal element by the fixation bars in the area of the flux barriers, wherein the at least one inner sheet metal element, the at least one intermediate sheet metal element, and the at least one outer sheet metal element are configured to exert a combined centrifugal force radially outward in response to operation of the rotor device, wherein the at least one drum is configured to oppose an entirety of the combined centrifugal force without any assistance form the fixation bars, the at least one drum thereby being configured to secure the at least one inner sheet metal element, the at least one intermediate sheet metal element, and the at least one outer sheet metal element against loosening and ejection.

20. The rotor device according to claim 19, wherein the fixation bars are configured to not withstand the combined centrifugal force.

* * * * *